Nov. 17, 1953     D. P. KEITH     2,659,374
STRAW CONVEYER FOR GRAIN COMBINES
Filed March 31, 1950
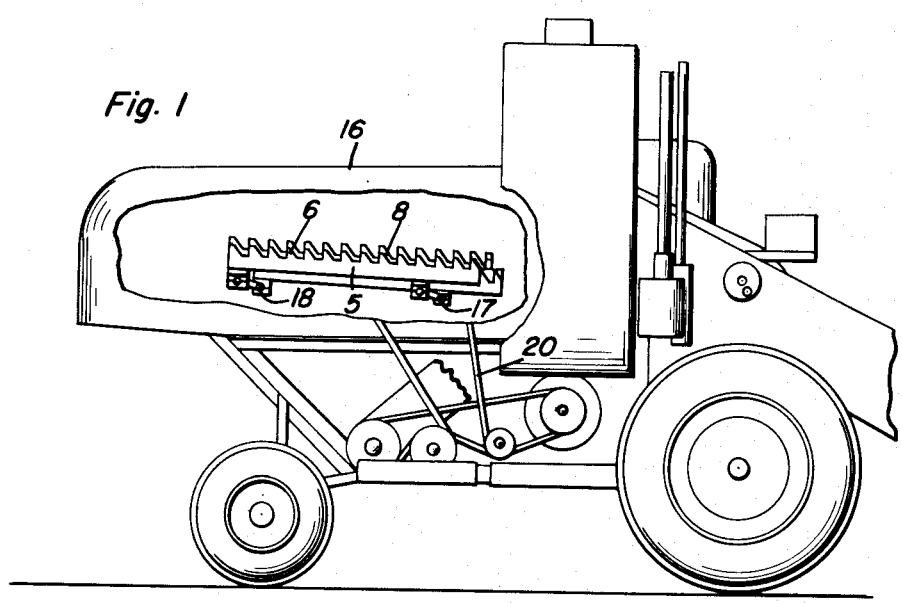
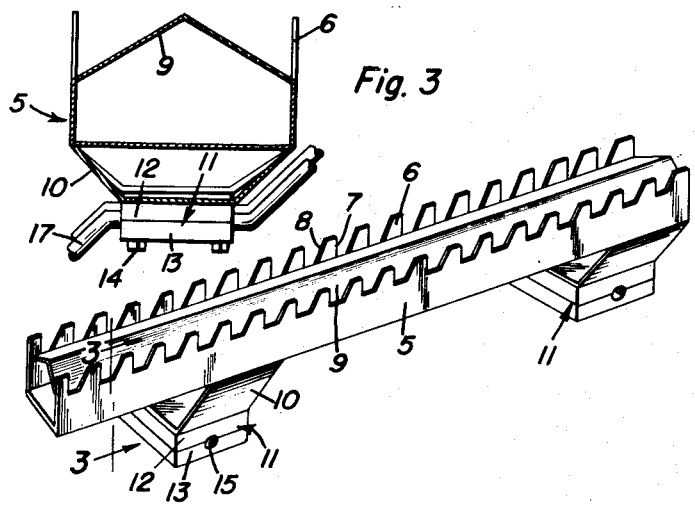
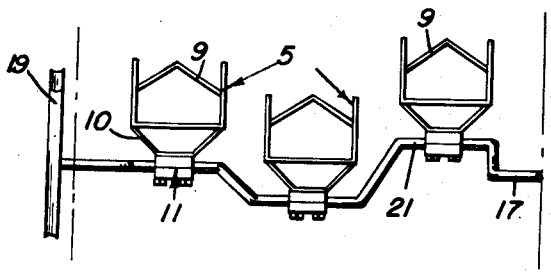
Dan P. Keith
INVENTOR.

Patented Nov. 17, 1953

2,659,374

UNITED STATES PATENT OFFICE 2,659,374

STRAW CONVEYER FOR GRAIN COMBINES

Dan P. Keith, Lubbock, Tex.

Application March 31, 1950, Serial No. 153,211

1 Claim. (Cl. 130—26)

1

The present invention relates to new and useful improvements in straw conveyors for grain combines and more particularly to a type of conveyor commonly known as a straw walker.

An important object of the invention is to provide a straw walker composed of a group of toothed bars having opposite oscillating movement whereby to progressively feed the straw in the combine to the delivery end thereof.

A further object of the invention is to provide a straw walker which eliminates clogging of the straw which causes congestion in the flow of the straw and impedes progress of the machine and wherein the straw is constantly fed through the machine and discharged therefrom.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of a combine with parts broken away and shown in section to show the group of straw walkers mounted in position therein;

Figure 2 is an enlarged perspective view of one of the straw walkers;

Figure 3 is a transverse sectional view taken on a line 3—3 of Figure 2, and

Figure 4 is an end elevational view showing one of the crank shafts for oppositely oscillating the straw walkers.

Referring now to the drawing in detail wherein for the purpose of illustration I have disclosed a preferred embodiment of the invention the numeral 5 designates one of the straw walkers which is of channel shaped construction and formed at its upper side edges with parallel rows of teeth 6. The teeth are formed with a perpendicular edge 7 and an inclined edge 8.

An inverted V-shaped grain deflector 9 is positioned longitudinally in the channel shaped member 5 from end to end thereof and with its side edges welded or otherwise suitably secured to the inner sides of the channel shaped member at the base of the teeth 6.

A substantially U-shaped bracket 10 is secured to the underside of channel shaped member 5 adjacent each end thereof and to the underside of which bearing blocks 11 are secured, each block being constructed of an upper block 12 and a lower block 13 secured to each other by bolts or

2 studs 14 and forming a transverse bore 15 in the blocks at their confronting faces.

A group of the straw walkers 5 are mounted in a grain combine 16 by means of front and rear crank shafts 17 and 18 journaled in the sides of the combine and driven by a pulley 19 at one end of shaft 17 by the belt pulley drive 20 of the combine. The bearing blocks 11 and the front and rear ends of the straw walkers 5 are secured to the cranks 21 of the front and rear crank shafts and the cranks are staggered with respect to each other to oppositely oscillate the group of straw walkers.

In the operation of the device the straw walkers 5 are mounted in position on the crank shafts 17 and 18 with the inclined edges 8 of the teeth 6 positioned forwardly, as shown in Figure 1 of the drawing, and as the crank shafts 17 and 18 rotate the cranks 21 alternately move the straw walkers 5 forwardly and rearwardly in an oscillating movement to feed the straw toward the rear end of the combine. Grain falling in the straw walkers is deflected from the sides thereof between the teeth 6 by the deflector 9.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A straw walker for grain combines comprising a channel member, teeth rising from the sides of the member, an inverted V-shaped grain deflector positioned longitudinally in the member to discharge grain falling into the member from the sides thereof at the base of the teeth, and means operating the member in an oscillating movement to feed straw from one end toward the other.

DAN P. KEITH.

References Cited in the file of this patent

UNITED STATES PATENTS

| Number | Name | Date |
|---|---|---|
| 242,349 | McNaught | May 31, 1881 |
| 274,395 | Schneider | Mar. 20, 1883 |
| 309,074 | Marshall | Dec. 9, 1884 |
| 810,625 | Crane | Jan. 23, 1906 |
| 1,617,246 | Freeman | Feb. 8, 1927 |
| 1,864,005 | Taylor | June 21, 1932 |